(12) United States Patent
Hara et al.

(10) Patent No.: US 9,769,343 B2
(45) Date of Patent: Sep. 19, 2017

(54) SLEEP MODE CONTROL SYSTEM TO REDUCE POWER CONSUMPTION AND TO PROVIDE A PRIVATE POWER GENERATION

(71) Applicant: KYOCERA Document Solutions Inc., Osaka (JP)

(72) Inventors: Nobuhiro Hara, Osaka (JP); Naoki Sawa, Osaka (JP); Hiroki Arakawa, Osaka (JP); Yuki Enokizono, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/168,072

(22) Filed: May 29, 2016

(65) Prior Publication Data
US 2016/0352950 A1  Dec. 1, 2016

(30) Foreign Application Priority Data
May 29, 2015  (JP) .................. 2015-109431

(51) Int. Cl.
*G06F 3/12* (2006.01)
*H04N 1/00* (2006.01)
(Continued)

(52) U.S. Cl.
CPC ....... *H04N 1/00896* (2013.01); *G06F 1/3284* (2013.01); *H04N 1/00832* (2013.01); *H04N 2201/0094* (2013.01)

(58) Field of Classification Search
CPC .......... H04N 1/00896; H04N 1/00832; H04N 2201/0094; G06F 1/3284
(Continued)

(56) References Cited

U.S. PATENT DOCUMENTS

2015/0180230 A1* 6/2015 Xu .................. H02M 1/10
                                                        307/32
2015/0234451 A1* 8/2015 Inukai .............. G06F 1/3284
                                                        713/323
(Continued)

FOREIGN PATENT DOCUMENTS

| JP | 2003-256086 A | 9/2003 |
| JP | 2008-118534 A | 5/2008 |
| JP | 2010-066908 A | 3/2010 |

*Primary Examiner* — Gabriel Garcia
(74) *Attorney, Agent, or Firm* — Hawaii Patent Services; Nathaniel K. Fedde; Kenton N. Fedde

(57) ABSTRACT

To provide a sleep mode control system restricting power consumption while an image forming apparatus (ifma) is in a sleep mode (slm) and allowing a user to deactivate the sleep mode without impairing his/her convenience. The sleep mode control system includes the imf entering the slm to reduce power consumption and a power generator provided below a passage floor on which the imf is mounted. The power generator has a power generation unit, when stepped, provides a private power generation and an electromotive force detection unit detecting an electromotive force generated at the power generation unit successively, generating a pulse signal using the resulting electromotive force, and outputting the resulting pulse signal successively. The ifma has a sleep control part deactivating the slm, while the ifma is being in the slm, based on a signal pattern of the pulse signal outputted from the electromotive force detection unit.

4 Claims, 8 Drawing Sheets

(51) Int. Cl.
 *G06F 1/32* (2006.01)
 *G06K 15/00* (2006.01)

(58) Field of Classification Search
 USPC .......................................... 358/1, 1.13–1.15
 See application file for complete search history.

(56) References Cited

U.S. PATENT DOCUMENTS

2016/0025781 A1* 1/2016 Kumeta ............... H05K 7/1498
 702/182
2016/0142576 A1* 5/2016 Yamaguchi ........ H04N 1/00891
 358/1.13

* cited by examiner

FIG. 2

| No. | Signal Pattern | Manipulation |
|---|---|---|
| 001 | p1 —a— p2 —b— p3 —c— p4 | Yes |
| 002 | p1 —d— p2 —d— p3 —e— p4 —f— p5 | Yes |
| 003 | p1 —g— p2 —g— p3 —g— p4 —g— p5 | No |
| ⋮ | ⋮ | ⋮ |

152

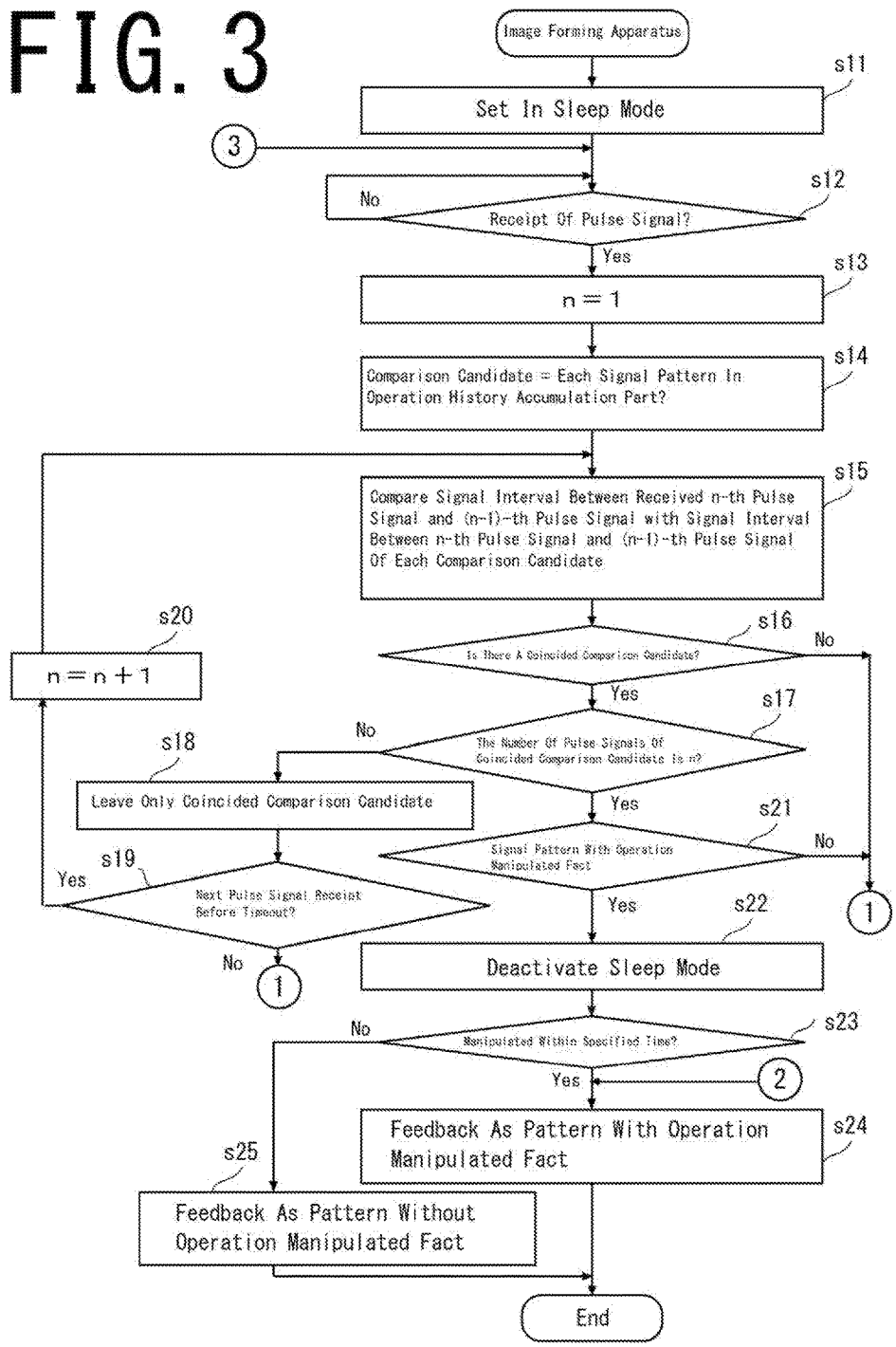

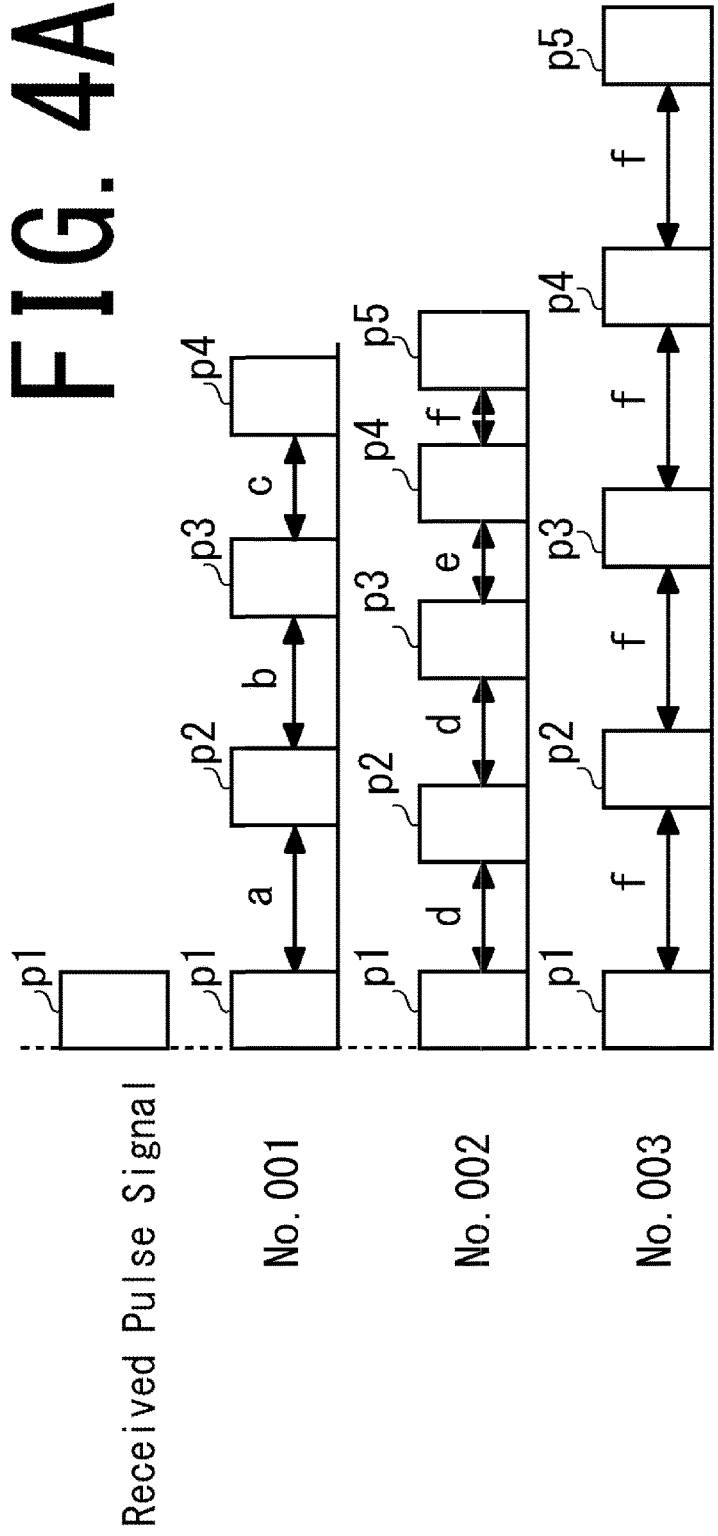

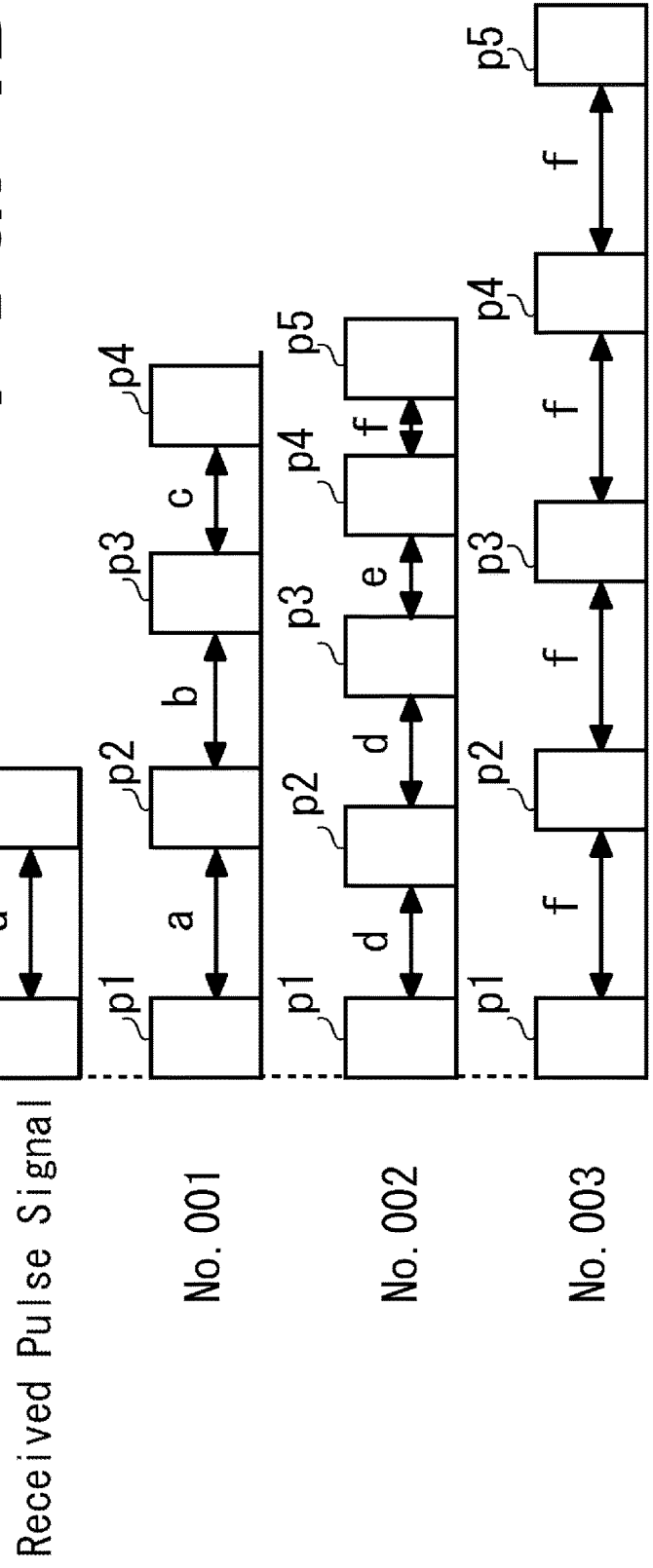

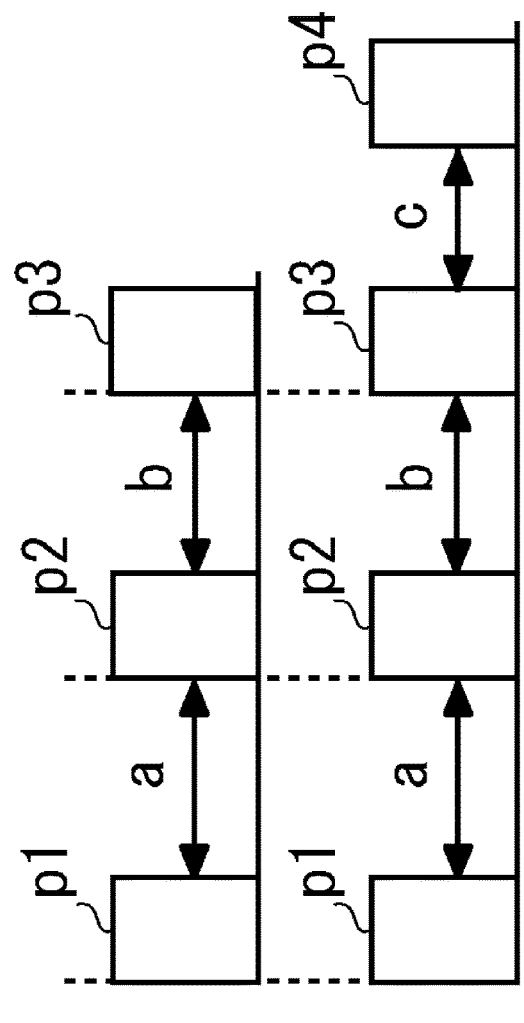

Received Pulse Signal
No. 001

SLEEP MODE CONTROL SYSTEM TO REDUCE POWER CONSUMPTION AND TO PROVIDE A PRIVATE POWER GENERATION

INCORPORATION BY REFERENCE

This application is based on and claims the benefit of priority from Japanese Patent Application No. 2015-109431 filed on May 29, 2015, the contents of which are hereby incorporated by reference.

BACKGROUND

The present disclosure relates to a sleep mode control system that includes an image forming apparatus that is configured to enter a sleep mode to reduce power consumption and a power generator that is configured to provide a private power generation.

Some image forming apparatuses are provided with a sleep mode function of reducing power consumption. For example, a technology has been proposed in which based on monitoring, via a network, the use state of a terminal device that is configured to issue an output request to an image forming apparatus, a control for the sleep mode of the image forming apparatus is made depending on the use state of the terminal device. In addition, a technology has also been proposed in which a user's sleep mode deactivating operation via the client server makes it possible to deactivate the sleep mode.

SUMMARY

Asleep mode control system according to the present disclosure is featured to include:

an image forming apparatus that is configured to enter a sleep mode to reduce power consumption; and an underfloor power generator provided below a passage floor on which the image forming apparatus is mounted, the power generator including a power generation unit that is configured to, when stepped, provide a private power generation and an electromotive force detection unit that is configured to detect an electromotive force in a successive manner that is generated at the power generation unit, generate a pulse signal using the resulting electromotive force, and output the resulting pulse signal in a successive manner, the image forming apparatus having a sleep control part that is configured to deactivate the sleep mode, while the image forming apparatus is in the sleep mode, based on a signal pattern of the pulse signal that is outputted from the electromotive force detection unit.

BRIEF DESCRIPTION OF THE DRAWINGS

FIG. 2 is an image view illustrating stored contents of an operation history accumulation part shown in FIG. 1;

FIG. 3 is a flowchart that is illustrative of a processing flow of a sleep control part shown in FIG. 1;

FIG. 4A is an imaginary schematic view that is indicative of an execution procedure according to the flowchart shown in FIG. 3;

FIG. 4B is an imaginary schematic view that is indicative of an execution procedure according to the flowchart shown in FIG. 3;

FIG. 4C is an imaginary schematic view that is indicative of an execution procedure according to the flowchart shown in FIG. 3;

DETAILED DESCRIPTION

Hereinbelow, with reference to the attached drawings, a description is made as to an exemplary embodiment of the present disclosure. It is to be noted that elements of the same functions are referred to by the same reference codes in the following description of the exemplary embodiment.

Figure 1:
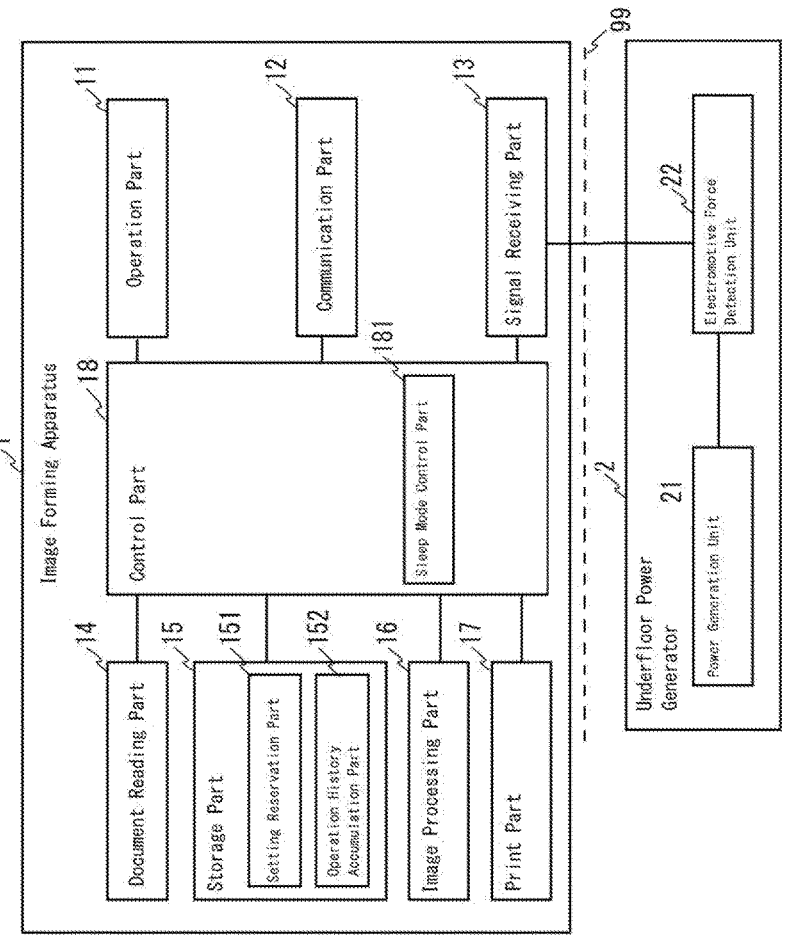
FIG. 1 is a system configuration diagram of a sleep mode control system according to an exemplary embodiment of the present disclosure.

Referring to FIG. 1, a sleep mode control system 100 according to the present exemplary embodiment includes an image forming apparatus 1 and an underfloor power generator 2.

The underfloor power generator 2 is provided under a passage 99 on which the image forming apparatus 1 is mounted so that a user who is willing to manipulate an operation part 11 of the image forming apparatus 1 walk along the underfloor power generator 2. The underfloor power generator 2 includes a power generation unit 21 and an electromotive force detection unit 22.

The power generation unit 21, which has a piezoelectric structure, has a function of generating an amount of electricity which depends on a pressure generated when the user steps the power generation unit 21.

The electromotive force detection unit 22 is capable of detecting an electromotive force that is generated in response to the user's depression on the power generation unit 21 in a successive manner to shape the detected electromotive force into a pulse signal and outputting the resulting pulse signal in a successive manner to a signal receiving part 13 of the image forming apparatus 1. It is to be noted that the electromotive force detection unit 22 is operable depending on the power generated by the power generation unit 21 and is capable of generating the pulse signal using the electromotive force and outputting the pulse signal to the signal receiving part 13. It is also to be noted that though for describing the present exemplary embodiment, a pulse signal is used as the signal outputted from the electromotive force detection unit 22, any other signal is available so long as it is capable of indicating a timing when the user depresses the power generation unit 21.

The image forming apparatus 1 is an MFP (Multi Function Peripheral) that has functions, for example, of copying, scanning, and network communication. The image forming apparatus 1 includes the operation part 11, a communication part 12, a signal receiving part 13, a document reading part 14, a storage part 15, an image processing part 16, a print part 17, and a control part 18.

The operation part 11 is a user interface that includes a touch panel and various operation keys, the touch panel being provided with a liquid crystal panel whose surface is arranged with transparent pressure sensors, the touch panel being configured to act as display means and input means, the various operation keys including, for example, numeric keys for inputting numerals such as the number of papers to be printed, a rest key for inputting an instruction of initializing setting information, a stop key for stopping a copying operation or erasing inputted numeric values, an interruption key for instructing an interrupting copy, a start key for inputting an output instruction to initiate a print operation.

The communication part 12 has a function of transmitting/receiving various data to/from an external terminal device via a network such as a LAN (Local Area Network).

The signal receiving part 13 has a function of receiving a pulse signal from the electromotive force detection unit 22 of the underfloor generator 2. Though the electromotive force detection unit 22 is in a wired connection to the signal receiving part 13 in FIG. 1, a wireless connection is available.

The document reading part 14 is a scanner that is configured to irradiate alight beam to a paper which is fed from a document feeding device (not shown) or which is placed by a user on a platen glass and to receive the resulting reflected light beams for reading a document image.

The storage part 15, which is storage means formed of a semiconductor memory or a HDD (Hard Disk Drive), is means for storing document data read by the document reading part 14 and document data received by the communication part 123. It is to be noted that in the present exemplary embodiment the document data is a generic term of document information including one or a combination of image data, text data, and graphic data.

The storage part 15 is also provided with a setting reservation part 151 and an operation history accumulation part 152.

The setting reservation part 151 has a function of reserving a sleep mode setting. In the sleep mode setting, it is possible to set whether a sleep mode is available (ON) or not (OFF). After the sleep mode is set to be ON, if no operation is conducted for a specified time interval, the image forming apparatus 1 is transited into the sleep mode, i.e., the image forming apparatus 1 is in a sleep state for reducing power consumption. The setting reservation part 151 is also configured to set whether or not the sleep mode is deactivated based on the pulse signal outputted from the electromotive force detection unit 22 while the image forming apparatus 1 is in the sleep mode. The following description will be made on an assumption that the contents of the setting reservation part 151 include the availability of the sleep mode and deactivating the sleep mode based on the pulse signal outputted from the electromotive force detection unit 22 while the sleep mode is in active.

The operation history accumulation part 152 has a function of accumulating an operation history as an association of the pulse signal outputted from the electromotive force detection unit 22 and an operation result of the operation part 11.

As shown in FIG. 2, in the operation history accumulation part 152, there are stored signal pattern Nos. of a set of pulse signals outputted from the electromotive force detection unit 22, their associated signal patterns, and operation results that are indicative of whether or not an operation is conducted after receipt of each of the signal patterns.

The number of the pulse signals that constitute the signal pattern which corresponds to the number of steps which is required for the user who is in stepping walking along the power generation unit 21 to reach a front portion of the operation part 11, and intervals between the pulse signals that constitute the signal pattern correspond to stride lengths when the user who is in stepping walking along the power generation unit 21 to reach the front portion of the operation part 11. It is to be noted that as to the pulse signals making up of the signal pattern is explained as the first through n-th signals in the order of output from the electromotive force detection part 22.

For example, the signal pattern assigned with No. 001, which is made up of the first pulse signal p1 through the fourth pulse signal p4, indicates that four steps require for the user who is in stepping walking along the power generation unit 21 to reach the front portion of the operation part 11. In this connection, in the No. 001, an interval between the first pulse signal p1 and the second pulse signal p2 is "a", an interval between the second pulse signal p2 and the third signal p3 is "b" that is shorter than "a", and an interval between the third pulse signal p3 and the fourth signal p4 is "c" that is shorter than "b".

In addition, the signal pattern assigned with No. 002, which is made up of the first pulse signal p1 through the fifth pulse signal p5, indicates that five steps require for the user who is in stepping walking along the power generation unit 21 to reach the front portion of the operation part 11. In this connection, in No. 002, an interval between the first pulse signal p1 and the second pulse signal p2 is "d", an interval between the second pulse signal p2 and the third signal p3 is "d", while an interval between the third pulse signal p3 and the fourth signal p4 is "e" that is shorter than "d" and an interval between the fourth pulse signal p3 and the fifth signal p5 is "f" that is shorter than "e".

Further, the signal pattern assigned with No. 003, which is made up of the first pulse signal p1 through the fifth pulse signal p5, indicates that five steps require for the user who is in stepping walking along the power generation unit 21 to reach the front portion of the operation part 11. In No. 003, an interval between two adjacent pulse signals is "g".

When the user approaches the operation part 11 for conducting an operation thereof, his/her stride lengths become shorter and shorter for stopping at the front portion of the operation part 11, thereby indicating a tendency of shortening the interval between pulse signals. Both No. 001 and No. 002 signal patterns involving an operation indicate gradual shortening of the interval between pulse signals. On the other hand, in No. 003 signal pattern involving no operation wherein the user passes without stopping at the front portion of the operation part 11, the intervals between pulse signals are the same.

The image processing part 16 is means for manipulating a specified image processing of document data. Examples of an image improving processing include an image magnification/reduction processing, a density adjustment, and a gradation adjustment.

The print part 17 is means for printing out the document data that is stored in the storage part 15 as a document image. For example, the print part 17 is configured to form a latent image on a surface of a photosensitive drum based on the document data read out from the storage part 15, performing an image formation in which the latent image is changed into a toner image using toner particles, transfer the toner image from the photosensitive drum onto a recording paper, fix the toner image on the recording paper, and discharge the resulting recording paper.

The control part 18, which is connected to each of the operation part 11, the communication part 12, the signal receiving part 13, the document reading part 14, the storage part 15, the image processing part 16, and the print part 17, is configured to execute an overall operation of the image forming apparatus 1 in response to specific instruction information that is inputted from the operation part 11. The control part 18 is an information processing part of a microcomputer or the like which is equipped with a ROM (Read Only Memory) and a RAM (Random Access Memory). In the ROM, there is stored a control program for controlling an operation of the image forming apparatus 1. The control part 18 is configured to read out the control program stored in the storage part 15 and develop the control program on the RAM, in order to control the whole device pursuant to the specific information inputted from the operation part 11.

The control part 18 is also configured to act as a sleep control part 181 for controlling the sleep state of the image forming apparatus 1.

The sleep control part 181 has a function of transitioning the image forming apparatus 1 from a normal mode to the sleep mode if no operation is conducted to the image forming apparatus 1 for a specified time interval. Thereby, power supply to, for example, the operation part 11 and a heater is turned off, which places the image forming apparatus 1 in the sleep state to suppress power consumption low.

The sleep control part 181 is also configured to make a determination, when the image forming apparatus 1 is placed in the sleep mode, whether or not the sleep mode should be deactivated, the determination being based on a comparison of a signal interval between the n-th pulse signal outputted from the electromotive force determination part 22 and the (n−1)-th pulse signal with a signal interval between corresponding signal patterns accumulated in the operation accumulation part 152. Then, if the determination indicates a deactivation, the sleep control part 181 deactivates the sleep mode of the image forming apparatus 1. The sleep control part 181 also has a function of providing a feedback, to the operation history accumulation part 152, of the signal patterns of the first pulse signal through the n-th pulse signal that are outputted from the electromotive force detection part 22 and their associated information whether or not the operation part 11 is manipulated thereafter.

With reference to FIG. 3, a flow of the processing of the sleep control part 181 is described in detail.

The sleep control part 181 sets the information forming apparatus 1 in the sleep mode (Step s11) and waits for a receipt of a pulse signal for the electromotive force detection part 22 via the signal receiving part 13 (Step s12). When the sleep control part 181 receives the pulse signal (when the result of Step s12 indicates "Yes"), a variable n is set to be 1 which is indicative of the number of the pulse signals outputted from the electromotive force detection part 22 (Step s13). Then, the sleep control part 181 acquires each of signal patterns stored in the operation history accumulation part 152 as a comparison candidate that is used for comparing the signal intervals between the pulse signals received from the electromotive force detection part 22 (Step s14).

Then, the sleep mode control part 18 makes a comparison of a signal interval between the n-th pulse signal and the (n−1)-th pulse signal both of which are received with a signal interval between n-th and (n−1)-th pulse signals of each of the comparison candidates (Step s15).

It is to be noted that as to the first pulse signal, no preceding pulse signal exists and therefore no signal interval exists. In this case, as to the first pulse signal p1 received from the electromotive force detection part 22, no signal interval exists for the first pulse signal in the signal pattern of each of the comparison candidates, resulting in a coincidence in comparison results. As to the second pulse signal p2, the signal interval between the second pulse signal p2 received from the electromotive force detection part 22 and the first pulse signal p1 which is adjacent to the preceding received pulse signal is compared to the signal interval between the second pulse signal p2 and the first pulse signal p1 in each of comparison candidate signal patterns.

Figure 5:
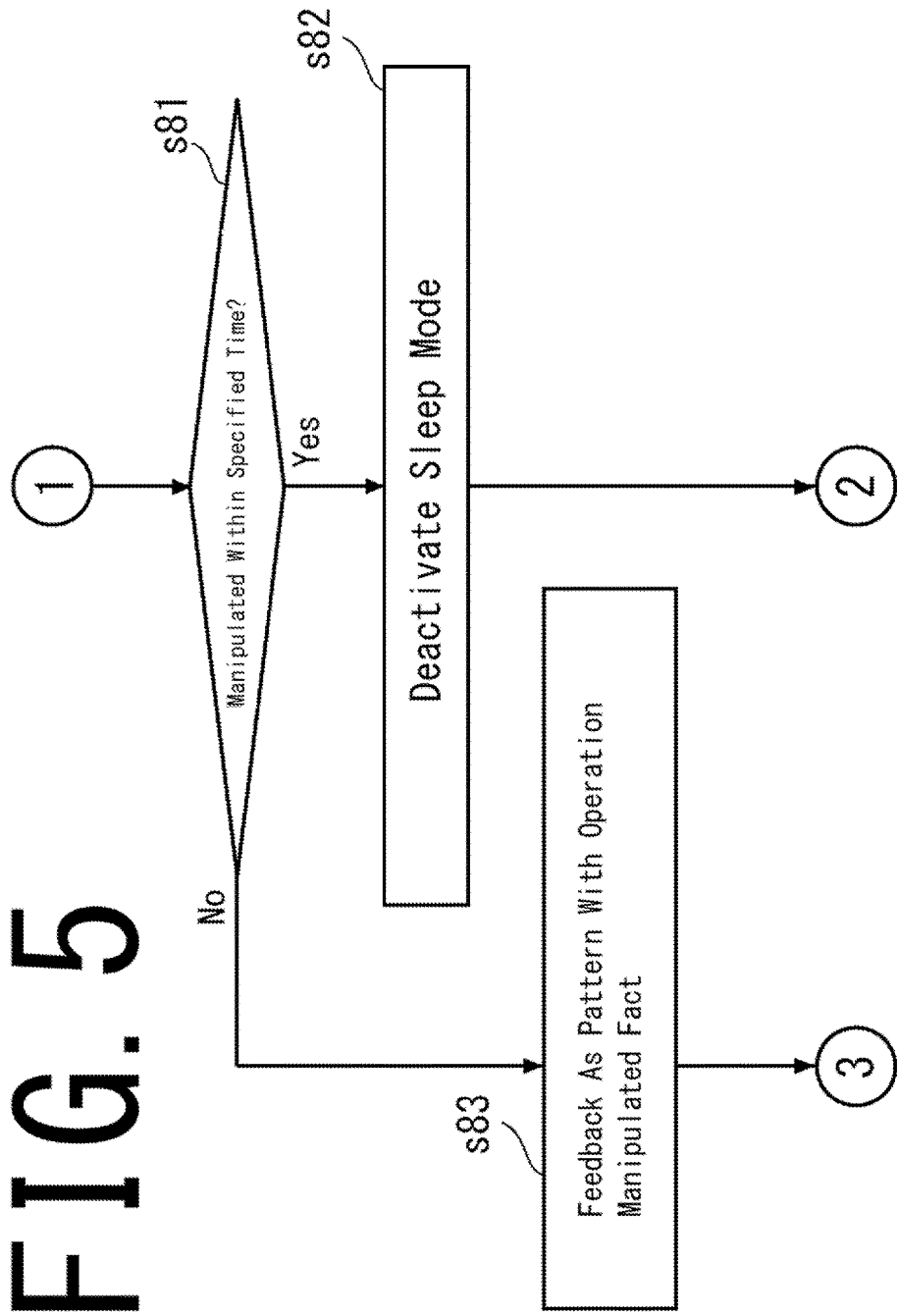
FIG. 5 is a flowchart that is illustrative of a processing flow of a sleep control part shown in FIG. 1.

If no comparison candidate is found (when the result of Step s16 is No), the program goes to Step s81 as shown in FIG. 5. On the other hand, if a comparison candidate is found (when the result of Step s16 is Yes), the sleep control part 181 determines whether or not the number of pulse signals of the coincided comparison candidate is n (Step s17).

If the number of pulse signals of the coincided comparison candidate is not n (when the result of Step s17 is No), that is if the number of pulse signals which constitute the signal pattern of the coincided comparison candidate is greater than n, the sleep control part 181 leaves only the coincided comparison candidate (Step s18) and determines whether or not the next pulse signal is received before a timeout (Step s19).

If the sleep control part 181 does not receive the next pulse signal before the timeout (when the result of Step s19 is No), the program goes to Step s81 shown in FIG. 5. On the other hand, if the sleep control part 181 receives the next pulse signal before the timeout (when the result of Step s19 is Yes), the sleep control part 181 makes an increment of n by 1, and the program returns to Step s15.

By executing Steps s15 through s20 in a repeated manner, the sleep control part 181 compares the signal patterns received from the electromotive force detection part 22 with the signals corresponding to each of the signal patterns which are accumulated in the operation accumulation part 152 in order to determine whether or not coincided signal patterns in signal construction are accumulated in the operation history accumulation part 152.

With reference to FIG. 4A, FIG. 4B, FIG. 4C, and FIG. 4D, the processing which goes from Step s15 to Steps s20 is described in detail. Each of FIG. 4A, FIG. 4B, FIG. 4C, and FIG. 4D is a chart for comparing the pulse signal that the sleep control part 181 receives from the electromotive detection part 22 via the signal receiving part 13 with the signal patterns accumulated in the operation history accumulation part 152 as shown in FIG. 2. It is to be noted that the operation history accumulation part 152 is assumed to store at least one previously prepared default signal pattern.

As shown in FIG. 4A, there is no immediate preceding pulse signal (0-th pulse signal) of the first pulse signal p1 received from the electromotive force detection part 22 and therefore no signal interval exists between the first pulse signal p1 and the 0-th pulse signal. Similarly, as to each of the signal patterns No. 001 through No. 003 which are accumulated in the operation accumulation part 152, there is no 0-th pulse signal and therefore no signal interval exist between the first pulse signal p1 and the 0-th pulse signal, which is in coincidence with the case of the first pulse signal p1 received from the electromotive force detection part 22 (Step s15, Step s16). In addition, the number of pulse signals in the signal pattern No. 001 is 4 and the number of pulse signals in each of the signal pattern No. 002 and the signal pattern No. 003 is 5, and therefore each of the numbers is not in coincidence with n (=1) (Step s17). Thus, the signal pattern No. 001, the signal pattern No. 002, and the signal pattern No. 003 are reserved as candidates (Step s18).

Then, before a timeout, when the second pulse signal p2 is received (if the result of Step s19 is Yes), n is incremented to "2" (Step s20) and as shown in FIG. 4B, the signal interval "a" between the second pulse signal p2 received from the electromotive force detection part 22 and the first pulse signal p1 is compared with the signal interval between the second pulse signal p2 and the pulse signal p1 in each of the signal pattern No. 001, the signal pattern No. 002, and the signal pattern No. 003. Here, the signal interval between the second pulse signal p2 and the first pulse signal p1 in the signal pattern No. 001 is "a", the signal interval between the second pulse signal p2 and the first pulse signal p1 in the signal pattern No. 002 is "d", and the signal interval between the second pulse signal p2 and the first pulse signal p1 in the signal pattern No. 003 is "f". Thus, the signal interval a between the second pulse signal and the first pulse signal in the signal pattern No. 001 is in coincidence with the signal interval a between the second pulse signal and the first pulse signal which are received from the electromotive force detection part 22 (Step s16). The number of pulse signals in the signal pattern No. 001 is 4 which is not in coincidence with n (=2) (when the result of Step s17 is No) and therefore only the signal pattern No. 001 is reserved which has the coincidence signal interval as the comparison candidate (Step 18).

In succession, before the timeout, when the third pulse signal p3 is received (when the result of Step s19 is Yes), n is incremented to "3" (Step s20) and as shown in FIG. 4C, the signal interval b between the third pulse signal p3 and the second pulse signal p2 which are received from the electromotive force detection part 22 is compared with the signal interval b between the third pulse signal p3 and the second pulse signal p2 in the pattern signal No. 001 reserved as the comparison candidate (Step s15). The signal interval b between the third pulse signal and the second signal in the signal pattern No. 001 is in coincidence with the signal interval b between the third pulse signal and the second pulse signal which are received from the electromotive force detection part 22 (when the result of Step s16 is Yes). In addition, the number of pulse signals in the signal pattern No. 001 is 4 which is not in coincidence with n (=3) (when the result of Step s17 is No) and therefore only the signal pattern No. 001 is reserved which has the coincidence signal interval as the comparison candidate (Step 18).

Figure 4D:
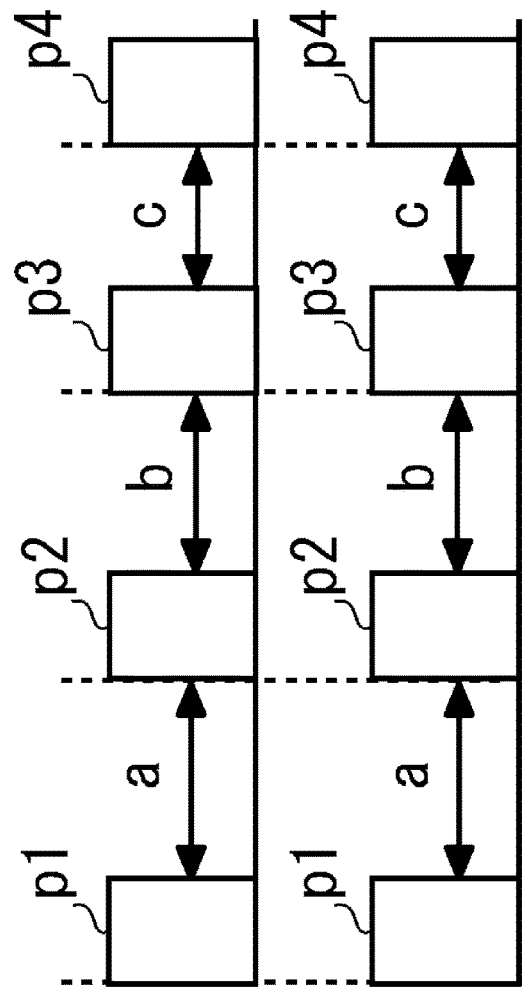
FIG. 4D is an imaginary schematic view that is indicative of an execution procedure according to the flowchart shown in FIG. 3.

Then, before the timeout, when the fourth pulse signal p4 is received (when the result of Step s19 is Yes), n is incremented to "4" (Step s20) and as shown in FIG. 4D, the signal interval "c" between the fourth pulse signal p4 and the third pulse signal p3 which are received from the electromotive force detection part 22 is compared with the signal interval "c" between the fourth pulse signal p3 and the third pulse signal p3 in the pattern signal No. 001 reserved as the comparison candidate (Step s15). The signal interval "c" between the fourth pulse signal and the third signal in the signal pattern No. 001 is in coincidence with the signal interval c between the fourth pulse signal and the third pulse signal which are received from the electromotive force detection part 22 (when the result of Step s16 is Yes). In addition, the number of pulse signals in the signal pattern No. 001 is 4 which is in coincidence with n (=4) (when the result of Step s17 is Yes). In conclusion, the sleep control part 181 determines that the first signal pattern through fourth signal patterns which are received from the electromotive force detection part 22 are in coincidence with the first signal pattern through signal pattern in No. 001.

It is to be noted that in the foregoing exemplary embodiment, for the determination of a coincidence between the signal intervals, the coincidence may have an allowable error of $\mp$ a few microseconds, in addition to the perfect coincidence. More specifically, the signal pattern received from the electromotive force detection part 22 may correspond to the signal pattern in the operation accumulation part 152.

Referring back to FIG. 3, if the number of pulse signals of the coincided comparison candidate is n (when the result of Step s17 is Yes), the sleep control part 181 determines whether or not this comparison candidate involves an operation (Step s21) by referring the operation history accumulation part 152. For example, with reference to FIG. 2, the No. 001 signal pattern involves an operation (Yes result in Step s21), which causes the sleep control part 181 deactivates the sleep mode of the image forming apparatus 1 (Step s22). Thereby, the image forming apparatus 1 returns to the normal state. It is to be noted that if the No. 001 signal pattern involves no operation (No result in Step s21), the program goes to step s81 shown in FIG. 5 without deactivating the sleep mode.

Subsequently, the sleep control part 181 determines whether or not the operation part 11 is manipulated within a specified time interval (Step s23). If a manipulation is determined (Yes result in Step s23), the sleep mode operation part 181 feedbacks the signal pattern formed by the signals received from the electromotive force detection part 22 to the operation history accumulation part 152 as an operation involving signal to the operation history accumulation part 152 (Step s24), and the program terminates this processing. For example, if the currently received signal pattern is stored in the operation accumulation part 152 as an operation precluding signal, the sleep mode control part 181 updates this to a signal pattern with an operation involving signal. In addition, if the currently received signal pattern is not stored in the operation accumulation part 152, the sleep mode control part 181 accumulates the currently received signal pattern in the operation accumulation part 152 as a signal pattern with an operation involving signal.

On the other hand, if the operation part 11 is not conducted within the specified time interval (No result in Step s23), the sleep mode operation part 181 feedbacks the signal pattern formed by the signals received from the electromotive force detection part 22 to the operation history accumulation part 152 as a signal pattern without an operation to the operation history accumulation part 152 (Step s25) and the program terminates this processing. Thereby, for example, if the currently received signal pattern is stored in the operation accumulation part 152 as a signal with an operation manipulated fact, the sleep mode control part 181 updates this to a signal pattern without an operation manipulated fact. If the currently received signal pattern is not stored in the operation accumulation part 152, the sleep mode control part 181 also accumulates the currently received signal pattern in the operation accumulation part 152 as a signal pattern without an operation manipulated fact.

Incidentally, if the result of Step s16 is No, if the result of Step s21 is No, or if the result of Step s19 is No, at Step s81 shown in FIG. 5, the sleep control part 181 determines whether or not the operation part 11 is manipulated. If the operation part 11 is manipulated within the specified time interval (Yes result in Step s81), the sleep mode control part 181 deactivates the sleep mode (Step s82), the program goes back to Step s24 shown in FIG. 3 to cause the sleep mode control part 181 to feedback the currently received signal pattern to the operation history accumulation part 152 as a signal pattern with an operation part conducted indication to the operation history accumulation part 152 (Step s24 in FIG. 3), and the program terminates this processing. On the other hand, if the operation part 11 is not manipulated within the specified time interval (No result in Step s81 shown in FIG. 5), the sleep mode control part 181 feedbacks the currently received signal pattern to the operation history accumulation part 152 as a signal pattern out an operation part conducted indication to the operation history accumulation part 152 (Step s83), and the program goes back to Step s12 shown in FIG. 3 without deactivating the sleep mode.

As described above, in the present exemplary embodiment, the underfloor power generator 2, which is configured to provide a private power generation in response to the depression on the passage floor, is provided below the passage floor on which the image forming apparatus 1 is mounted and the sleep control part 181 is provided that is configured to deactivate, while the image forming apparatus 1 is in the sleep mode, the sleep mode based on the pulse signal produced by the electromotive force generated by the underfloor power generator 2. Thus, if the user approaches the image forming apparatus 1 for operating the same, the resulting private power generation of the underfloor power generator 2 that is stepped by the user informs the user's approach to the image forming apparatus 1 to the image forming apparatus 1, which allows the image forming apparatus 1 that is in the sleep mode to restrict power consumption. In addition, the user's movement to the image forming apparatus by stepping on the underfloor power generator 2 establishes an automatic deactivation of the sleep mode, which makes the user free from cumbersome operations for deactivating the sleep mode. For example, it is possible to establish an automatic deactivation of the sleep mode when the user comes to be in front of the operation part 11 as for automatic doors by providing the underfloor power generator 2 below only the passage floor on which the user stands in front of the operation part 11 and by causing the sleep mode control part 181 to deactivate the sleep mode in response to a receipt of one pulse signal from the underfloor power generator 2 while the image forming apparatus 1 is in the sleep mode.

The image forming apparatus 1 is also provided with the operation history accumulation part 152 that is configure to accumulate the pulse patterns outputted from the electromotive force detection part 22 between an initiation of the user's movement along the passage and the user's initiation of manipulating the operation part 11. The sleep mode control part 181 determines, when the pulse signal is outputted from the electromotive force detection part 22 while the image forming apparatus 1 is in the sleep mode, whether or not the pulse signal outputted from the electromotive force detection part 22 corresponds to the signal pattern which is accumulated in the operation history accumulation part 512 when the operation part 11 is manipulated and if the result is positive the sleep mode control part 181 deactivates the sleep mode. Thus, it is possible for the image forming apparatus 1 not to be deactivated the sleep mode if the user passes the operation part 11 without manipulating the same.

The sleep mode control part 181, while the image forming apparatus is in the sleep mode, is also configured to feedback the associated signal pattern outputted from the electromotive force detection part 22 and operation result indicating whether or not the operation part 11 is manipulated after receipt of this pulse pattern. Thus, it is possible to accumulate the signal pattern depending on the user's pace, which enhances the precision upon deactivation of the sleep mode.

Also, when the user approaches the operation part 11 for conducting an operation thereof, his/her stride lengths become shorter and shorter for stopping at the front portion of the operation part 11, thereby indicating a tendency of shortening the interval between pulse signals from the midway of the signal pattern. In light of this, while the image forming apparatus 1 is in the sleep mode, if the sleep mode control part 181 detects a gradual decrease in the signal interval, the signal sleep mode control part 181 may deactivate the sleep mode. This provides an initiation of a preparation for returning the image forming apparatus 1 into the normal mode before the user comes to be in front of the operation part 11, which makes it possible to reduce a waiting time for the user in front of the operation part 11 which is required for the image forming apparatus 1 to enter the normal mode.

It is to be noted that in this case, regardless of the signal pattern accumulated in the operation accumulation part 152, the sleep mode control part 181 may activate the sleep mode, if the sleep mode control part 181 detects that the signal interval becomes shortened as to the signal pattern outputted from the electromotive force detection part 181. In addition, the sleep mode control part 181 may activate the sleep mode, if the sleep mode control part 181 detects that the signal interval becomes shortened as to the signal pattern outputted from the electromotive force detection part 181 after determination of a quasi-coincidence between the signal pattern outputted from the electromotive force detection part 152 and the signal pattern with the fact of being operated which is accumulated in the operation history accumulation part 152.

In a commonly available technology, there is a problem in that power consumption is required for monitoring the on-network terminal devices even while an image forming apparatus is in a sleep mode. The common technology has also another problem in which, for deactivating the sleep mode, the user is compelled to operate the client terminal, thereby impairing his/her convenience.

According to the present disclosure, it is possible to provide a new technology which is capable of restricting power consumption while an image forming apparatus is in a sleep mode and allowing a user to deactivate the sleep mode without impairing his/her convenience.

The present disclosure is not limited to the exemplary embodiments as described above and therefore, needless to say, various variations and modifications can be made without departing from the spirit of the present disclosure.

What is claimed is:

1. A sleep mode control system comprising:
   an image forming apparatus that is configured to enter a sleep mode to reduce power consumption; and
   an underfloor power generator provided below a passage floor on which the image forming apparatus is mounted,
   the underfloor power generator including
   a power generation unit that is configured to, when being stepped, provide a private power generation; and
   an electromotive force detection unit that is configured to detect an electromotive force in a successive manner that is generated at the power generation unit, generate a pulse signal using the resulting electromotive force, and output the resulting pulse signal in a successive manner,
   the image forming apparatus having a sleep control part that is configured to deactivate the sleep mode, while the image forming apparatus is in the sleep mode, based on a signal pattern of the pulse signal that is outputted from the electromotive force detection unit.

2. The sleep mode control system according to claim 1, wherein the image forming apparatus includes an operation history accumulation part that is configured to accumulate the signal pattern outputted from the electromotive force detection part for a time duration from an initiation of the user's movement along the passage until the user's initiation of manipulating the operation part, and the sleep mode control part is configured to determine, while the image forming apparatus is in the sleep mode, whether or not the signal pattern outputted from the electromotive force detection part corresponds to the signal pattern accumulated in the operation history accumulation part as of a manipulation of the operation part and deactivate the sleep mode if the result is positive.

3. The sleep mode control system according to claim 2, wherein the sleep mode control part is configured, while the image forming apparatus is in the sleep mode, to feedback the signal pattern outputted from the electromotive force detection part and its associated operation result indicating whether or not the operation part is manipulated after receipt of the signal pattern outputted from the electromotive force detection part.

4. The sleep mode control system according to claim 1, wherein the sleep mode control part is configured, while the image forming apparatus is in the sleep mode, to deactivate the sleep mode if the sleep mode control part detects a gradual interval decrease between pulses of the signal pattern outputted from the electromotive force detection part.

\* \* \* \* \*